Jan. 3, 1950   H. J. GREINER   2,493,132
POWER TAKE-OFF TRANSMISSION
Filed April 6, 1948   3 Sheets-Sheet 1
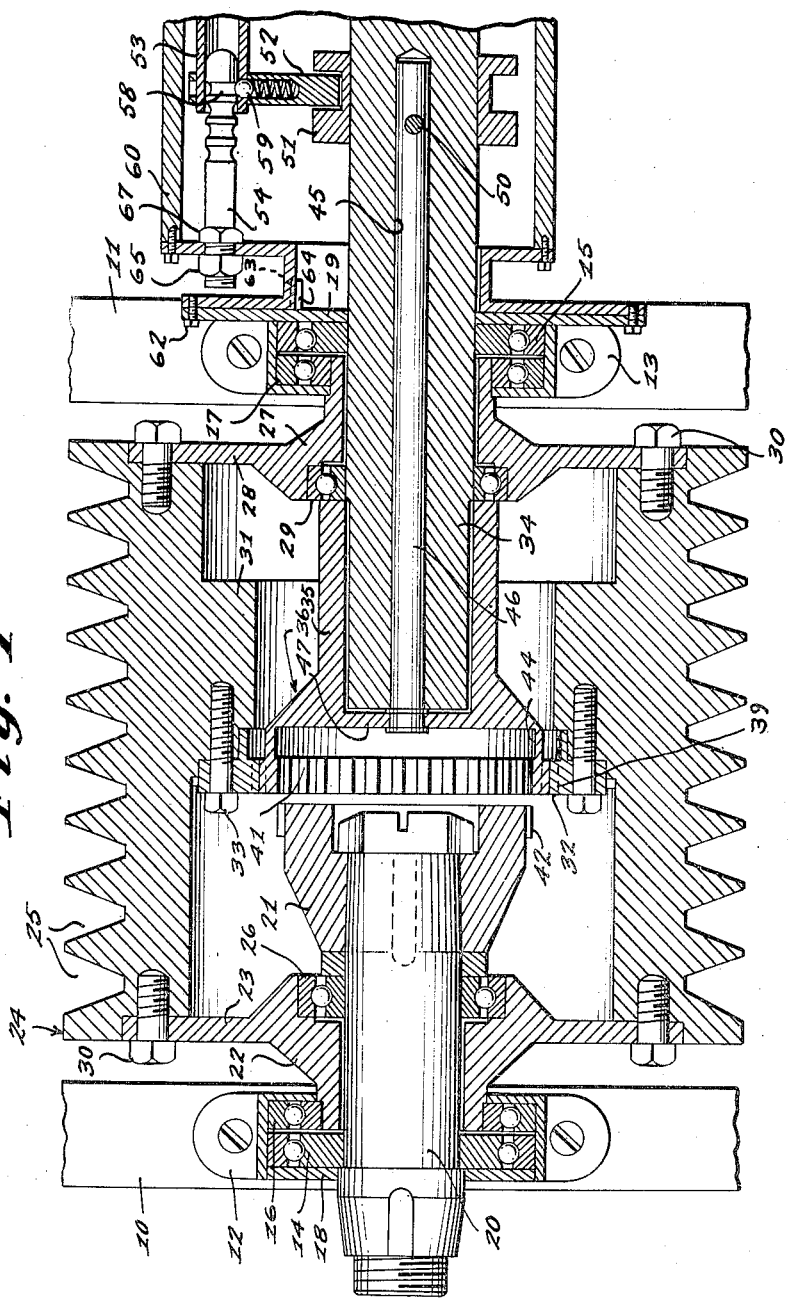
INVENTOR.
HENRY J. GREINER
BY
McMorrow, Berman & Davidson
ATTORNEYS

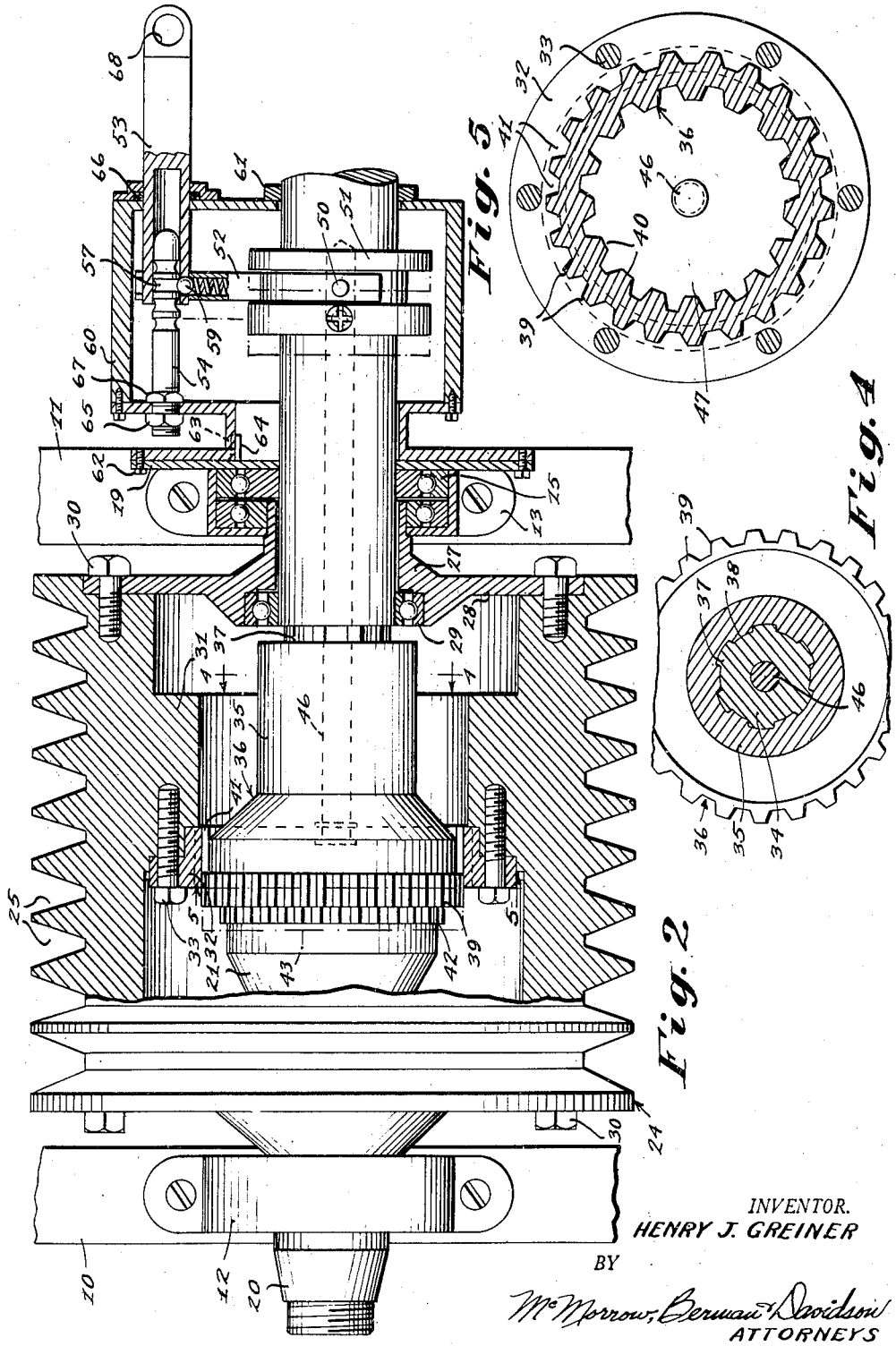

Jan. 3, 1950    H. J. GREINER    2,493,132
POWER TAKE-OFF TRANSMISSION
Filed April 6, 1948      3 Sheets-Sheet 3
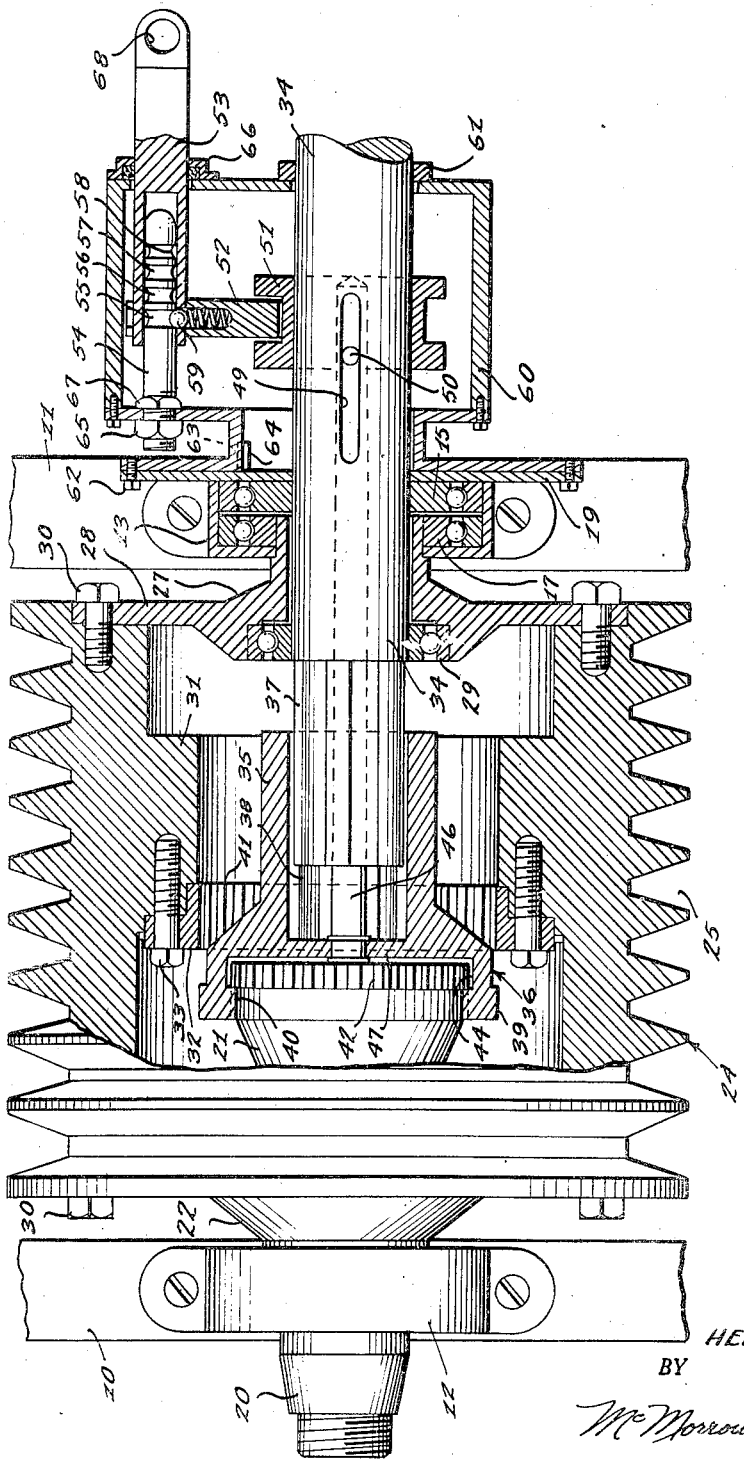
INVENTOR.
HENRY J. GREINER
BY
McMorrow, Berman & Davidson
ATTORNEYS

Patented Jan. 3, 1950

2,493,132

UNITED STATES PATENT OFFICE 2,493,132

POWER TAKE-OFF TRANSMISSION

Henry J. Greiner, Anoka, Minn.

Application April 6, 1948, Serial No. 19,405

2 Claims. (Cl. 74—15.88)

My invention relates to power take-off transmissions, and more particularly to such transmissions wherein a drive shaft is selectively coupled to one or more driven devices for operating the latter.

With the foregoing in view, an object of my invention is to provide an improved power take-off transmission.

A further object is to provide an improved power take-off transmission which provides means for coupling a single drive device to either or both of a pair of driven devices.

A further object is to provide in a power take-off transmission such as that last described novel means providing a sealed-in lubrication for the moving parts.

A further object is to provide a novel power take-off transmission which includes means for coupling a drive and a driven shaft together and simultaneously or alternately provide a power take-off means for the drive shaft.

A further object is to provide an improved power take-off transmission which is a compact device embodying sealed-in lubrication, which is readily and economically manufactured and which is strong and sturdy in use.

Other objects and advantages reside in the particular structure of the invention, combination and arrangement of the several parts thereof, and will be readily apparent to those skilled in the art upon reference to the attached drawing in connection with the following specification, wherein the device is shown, described, and claimed.

In the drawing:

Figure 1 is a longitudinal vertical sectional view taken centrally through a preferred form of the invention;

Figure 2 is a view similar to Figure 1, but showing certain of the parts thereof in elevation and showing another position of the parts;

Figure 3 is a view similar to Figures 1 and 2, but showing the parts in a third position;

Figure 4 is a transverse vertical sectional view taken substantially on the plane of the line 4—4 of Figure 2;

Figure 5 is a transverse vertical sectional view taken substantially on the plane of the line 5—5 of Figure 2.

In the drawing, wherein like reference characters have been used throughout the several views to designate like parts, 10 and 11 designate a pair of spaced frame members respectively mounting bearing housings 12 and 13 thereon. Such housings respectively house a pair of anti-friction bearings. Thus, the left-hand bearing housing, Figures 1 to 3, includes an outer bearing 14 and an inner and independent bearing 16. In like manner, the right-hand housing 13 includes an outer bearing 15 and an inner bearing 17.

A driven shaft 20 is operatively connected to the outer bearing 14 of the left-hand housing 12, whereby to mount such shaft for free rotation relative to the support 10. A suitable sealing disc, or the like, 18 surrounds the shaft 20 outwardly of the housing 12 to provide a lubricant seal for the bearings. In like manner, the outer bearing 15 for the right-hand housing 13 has mounted therein for rotation relative thereto a drive shaft 34. The outer surface of the housing 13 is sealed by a suitable sealing washer or sealing ring 19. The left-hand inner bearing 16 rotatably mounts the journal of a hub 22 of an end plate 23 of a power take-off wheel 24. The outer periphery of the wheel 24 may be formed with a plurality of pulley grooves 25. Obviously, the outer periphery of the wheel 24 could embrace gears, sprockets, or any other form of power transmission means.

The inner surface of the end plate 23 is recessed to seat therein a bearing 26 which supports the shaft on the one hand and the hub 22 of the take-off wheel 24 on the other. Thus, the shaft 20 is mounted in both the outer bearing 14 and also the hub bearing 26. In like manner, the hub 22 is rotatable in the inner bearing 16, and on the hub bearing 26. Obviously, then, the driven shaft 20 and the wheel 24 are free to rotate relative to each other on the bearings aforesaid. The inner end of the driven shaft 20 has fixed thereon in any suitable manner a driven circular clutch element in the form of a gear or pinion 21.

The right-hand inner bearing 17 rotatably mounts the journal of a hub 27 of the end plate 28 for the take-off wheel 24. The inner surface of the hub 27 also mounts a bearing 29 which rotatably supports the hub thereon and also cooperates with the outer bearing 15 to rotatably mount the drive shaft 34. The inner free end of the drive shaft 34 has mounted thereon a hub 35 for a cup-shaped clutch element in the form of a driving cup-gear 36. The inner periphery of the hub 35 and the outer periphery of the free end of the drive shaft 34 are formed with interengaging splines 38 and 37, respectively, Figure 4, whereby the driving gear 36 is axially slidable on the drive shaft 34, while simultaneously being rotatable therewith. Also, it is obvious that the drive shaft and the take-off wheel are freely rotatable relative to each other by virtue of their bearings 17, 15 and 29.

The end plates 23 and 28 are secured in place on the wheel 24 by any suitable fastening means, such as the bolts or machine screws 30, whereby to provide a hollow hub or casing which is adapted to be filled with lubricant for the lubrication of the parts contained therein. As aforesaid, such lubricant is sealed in place within the wheel 24 by means of the grease washers 18 and 19.

The inner periphery of the take-off wheel 24 is provided with any suitable means, such as the annular boss 31, to which is secured an annular clutch element in the form of a ring gear 32 by any suitable means, such as the machine screws 33. The ring gear 32 is provided with inwardly-directed teeth 41 which are adapted to mesh at times with the outwardly-directed teeth 39 of the cup-gear 36. The cup-gear 36 is also provided with a set of inwardly-directed teeth 40, Figure 5, which are adapted to mesh at times with outwardly-directed teeth 42 on the driven pinion 21. Thus, Figure 1 shows the teeth 39 of the cup-gear 36 in driving mesh with the teeth 41 of the ring gear 32. In Figure 2, the outwardly-directed teeth 39 of the cup-gear are in mesh with the inwardly-directed teeth 41 of the ring gear 32, while at the same time the inwardly-directed teeth 40 of the cup-gear are in mesh with the outwardly-directed teeth 42 of the driven pinion. Referring again to Figure 2, if the cup-gear 36 is now moved from right to left to the broken line position designated by 43, it will be apparent that the exterior teeth 39 will be disengaged from the teeth 41 of the ring gear, but that the inwardly-directed teeth 40 will be still in mesh with the teeth 42 of the pinion 21. It is, therefore, apparent from the foregoing that the cup-gear is selectively adapted to mesh with the ring gear 32, whereby to drive the take-off wheel 24, or with both the ring gear 32 and the pinion 21, whereby to drive both the take-off wheel 24 and the driven shaft 20 simultaneously, or the cup-gear may be registered with the pinion alone, whereby to drive only the driven shaft 20. Finally, if the cup-gear 36 is moved still further to the left, Figure 3, it will be noted that the inwardly-directed teeth 40 will pass beyond the teeth 42 of the pinion, whereby the latter are located in an untoothed recess 44 of the cup-gear. Obviously, this last position represents a neutral position, whereby the drive shaft 34 is free to rotate without transmitting any power to either the take-off wheel 24 or the driven shaft 20.

Any suitable means may be provided for actuating the drive gear 36 axially of the drive shaft 34. In the preferred form of the invention, the drive shaft 34 is axially bored, as at 45, for slidably seating therein an actuating rod 46. The forward end of the rod 46 is fixed by any suitable means to the web 47 of the cup-gear 36. Rearwardly of the cup-gear 36, the drive shaft 34 is longitudinally slotted, as at 49, for the passage therethrough of a pin 50 which operatively connects a double-flanged collar 51 onto the shaft 34 for rotating and sliding movement relative thereto. A yoke 52 has its bifurcated lower ends received in the collar 51 between the flanges thereof for actuating the same longitudinally of the drive shaft 34.

The yoke 52 depends from the forward end of a tubular actuating rod 53 which in turn is slidable on a guide rod 54 in a telescoping manner. The free inner end of the guide rod 54 is formed with a plurality of adjacent annular grooves 55, 56, 57 and 58 thereon in which a spring-loaded ball latch 59 carried by the yoke 52 is selectively seated. A lubricant-tight casing 60 surrounds the drive shaft 34 together with the collar 51 and the telescoped ends of the actuating rods 53 and guide rod 54. The casing 60 is preferably fixed to either the support 11 or a related part, such as the bearing housing 13, by being bolted thereto, as at 62. Any suitable means, such as grooves 63 and the key 64, may be provided for centering the casing 60 in proper relation to the related parts. The guide rod 54 is fixed to the casing 60 in any suitable manner, as by a nut 65 threaded on the free end thereof outwardly of the end wall of the casing and a lock nut 67 on the inner periphery of the casing end wall. Any suitable packing gland, such as 66, surrounds the outer end of the actuating rod 53 which projects through the opposite end wall of the casing 60. A suitable packing washer 61 surrounds the drive shaft 34 to provide a grease seal for the outer end wall of the casing 60. The free end of the actuating rod 53 is formed with any suitable means, such as the eye 68, for detachable connection to a suitable actuating means, not shown.

The operation of the device in brief is readily accomplished by actuating the actuating rod 53, whereby to move the same and the collar 51 longitudinally relative to the drive shaft 34. Such movement, by virtue of the pin 50 and slot 49, together with the slidable rod 46, is effective to move the cup or drive gear 36 longitudinally of the drive shaft 34. The ball latch 59 will seat in a selected one of the annular grooves 55, 56, 57 or 58, whereby to maintain the drive gear in a selected position. Thus, with the ball 59 seated in the groove 58, Figure 1, the drive gear is locked in meshing engagement with the ring gear of the take-off wheel 24, whereby to drive the latter without driving the driven shaft 20. However, if the drive rod 53 is advanced to seat the ball latch 59 in the next groove 57, the drive gear is connected simultaneously to both the drive or take-off wheel 24 and to the pinion 21 of the driven shaft 20. If the ball latch is next seated in the next adjacent groove 56, such position not being shown except by broken line 43, Figure 2, the drive gear will be engaged with the pinion 21 whereby to drive the driven shaft 20 while leaving the take-off wheel 24 free for relative rotation. Finally, if the actuating rod 53 is advanced to Figure 3 position, wherein the ball latch is seated in the last groove 55, the drive gear 36 is disengaged from both the ring gear 32 and the pinion 21, and the device may be said to be in neutral.

While I have shown and described what is now thought to be a preferred embodiment of the invention, it is to be understood that the same is susceptible of other forms and expressions. Consequently, I do not limit myself to the precise structure shown and described hereinabove except as hereinbefore claimed.

I claim:

1. A power take-off transmission, comprising a drive shaft and a driven shaft, each including a free end, means rotatably mounting said shafts with said free ends in juxtaposed end-to-end relation, a hollow cylindrical hub for a power take-off wheel, means mounting said hub concentrically on said shafts for free rotation relative thereto, an annular clutch element including internal clutch teeth carried by said hub inwardly thereof in the region of said free end of said drive shaft, a circular clutch element fixed to said free end of said driven shaft in axially-spaced juxtaposition relative to said annular clutch element, said circular clutch element having external clutch teeth having an outside diameter smaller than the inside diameter of said clutch teeth of said annular clutch element, a cup-shaped clutch element splined to said drive shaft, said cup-shaped clutch element including internal and external clutch teeth, said external teeth being engageable with said clutch teeth of said annular clutch element, said internal teeth of said cup-shaped clutch element being engageable with said clutch teeth of said circular clutch element, means for moving said cup-shaped clutch element axially of said drive shaft from a neutral disengaged position to a position coupling said drive shaft to said driven shaft and said hub and to a position coupling said drive shaft to a selected one of said driven shaft and hub.

2. A power take-off transmission, comprising a drive shaft and a driven shaft, each including a free end, means rotatably mounting said shafts with said free ends in juxtaposed end-to-end relation, a power take-off wheel including an internally-toothed annular clutch element fixed thereto, means mounting said wheel concentrically of said shafts for free rotation relative thereto, said annular clutch element including internal clutch teeth being concentrically spaced from one of said free ends, a circular clutch element fixed to said free end of one of said shafts and including external clutch teeth, a cup-shaped clutch element splined to said free end of the other shaft, said cup-shaped clutch element including internal clutch teeth adapted to mesh with said teeth of said circular clutch element and external clutch teeth adapted to mesh with said teeth of said annular clutch element, and means for moving said cup-shaped clutch element axially of said last shaft from a neutral disengaged position to a position in mesh with both of said circular clutch element and annular clutch element and to positions selectively meshing with one of said circular clutch element and annular clutch element.

HENRY J. GREINER.

REFERENCES CITED

The following references are of record in the file of this patent:

UNITED STATES PATENTS

| Number | Name | Date |
|---|---|---|
| 2,379,775 | Young | July 3, 1945 |
| 2,390,513 | Couse | Dec. 11, 1945 |